(12) United States Patent
Cole

(10) Patent No.: US 11,008,711 B2
(45) Date of Patent: May 18, 2021

(54) SEGMENTED TRACK FOR A MAGLEV VEHICLE

(71) Applicant: SkyTran, Inc., Moffett Field, CA (US)

(72) Inventor: John Cole, Dana Point, CA (US)

(73) Assignee: SKYTRAN, INC., Irvine, CA (US)

( * ) Notice: Subject to any disclaimer, the term of this patent is extended or adjusted under 35 U.S.C. 154(b) by 573 days.

(21) Appl. No.: 15/774,559

(22) PCT Filed: Nov. 10, 2016

(86) PCT No.: PCT/US2016/061295
§ 371 (c)(1),
(2) Date: May 8, 2018

(87) PCT Pub. No.: WO2017/083499
PCT Pub. Date: May 18, 2017

(65) Prior Publication Data
US 2020/0256018 A1      Aug. 13, 2020

Related U.S. Application Data

(60) Provisional application No. 62/253,545, filed on Nov. 10, 2015.

(51) Int. Cl.
*E01B 25/30* (2006.01)
*B60L 13/04* (2006.01)
*B60L 13/10* (2006.01)

(52) U.S. Cl.
CPC ............ *E01B 25/305* (2013.01); *B60L 13/04* (2013.01); *B60L 13/10* (2013.01)

(58) Field of Classification Search
CPC .......... E01B 25/00; E01B 25/04; E01B 25/22; E01B 25/24; E01B 25/30; E01B 25/305;
(Continued)

(56) References Cited

U.S. PATENT DOCUMENTS 7,562,628 B2 *   7/2009   Wamble, III ........... B60L 13/04
                                                         104/281
8,505,463 B2 *   8/2013   Kwon .................... B60L 13/03
                                                         104/290

(Continued)

FOREIGN PATENT DOCUMENTS

WO     WO 2017/083499         5/2017

OTHER PUBLICATIONS

International Search Report and Written Opinion by the International Searching Authority for the corresponding International Patent Application PCT/US2016/061295, listed as item #5 above, dated Jan. 25, 2017, 9 pages.

*Primary Examiner* — Jason C Smith
(74) *Attorney, Agent, or Firm* — Polsinelli PC (57) ABSTRACT

A segmented track for a Maglev vehicle includes a structural support portion and a Maglev portion fastened to the structural support portion. Each segment of the structural support portion is formed by fusing together three cast metal components. Neighboring ones of the structural support segments are joined together end-to-end by fused metal, and neighboring ones of the reaction rail segments are joined together end-to-end by fused metal. The positioning and joining of the successive segments is done in the field using on site jigs and machines.

14 Claims, 13 Drawing Sheets

(58) Field of Classification Search
CPC .......... E01B 25/32; E01B 26/00; B60L 13/00; B60L 13/04; B60L 13/10
See application file for complete search history.

(56) References Cited

U.S. PATENT DOCUMENTS

| | | | |
|---|---|---|---|
| 9,090,167 B2 * | 7/2015 | Wamble, III | B60L 13/04 |
| 2007/0089636 A1 * | 4/2007 | Guardo, Jr. | B60L 13/10 104/281 |
| 2008/0148991 A1 * | 6/2008 | Wamble | B60L 13/04 104/282 |
| 2014/0130703 A1 * | 5/2014 | Wamble, III | B60L 13/04 104/281 |
| 2020/0256018 A1 * | 8/2020 | Cole | B60L 13/00 |

* cited by examiner

SEGMENTED TRACK FOR A MAGLEV VEHICLE

CROSS REFERENCE TO RELATED APPLICATIONS

The present application is a U.S. National Stage Entry of PCT Application No. PCT/US2016/061295, filed Nov. 10, 2016, which claims priority to and benefit from U.S. Provisional Application No. 62/253,545, filed Nov. 10, 2015, the contents of which are entirely incorporated by reference herein.

FIELD

The present disclosure generally relates to the construction of a track for a Maglev vehicle.

BACKGROUND

Magnetic levitation (hereinafter, "Maglev") may provide advantages compared to conventional wheels on tracks. Generally, Maglev has low or zero mechanical friction and thus parts in Maglev systems do not wear from contact. Maglev has a wide range of speeds over which it can operate, and in operation it generates relatively low noise levels.

Maglev can be applied to traditional large train system architecture as well as monorail or personal rapid transport (PRT) systems. Maglev may use active or passive magnetic interaction for levitation and centering functions, and may use inductive or synchronous magnetic interaction for propulsion. For example, a networked guideway transit system may use permanent magnet coupling to provide primary lift passively with motion, and may use electrodynamic repulsion to create centering forces at most operational speeds while integrating linear motor functions with electrodynamic centering functions. See, for example, Wamble, III et al. U.S. Pat. No. 7,562,628 issued Jul. 21, 2009, incorporated herein by reference, and Wamble, III et al. U.S. Pat. No. 8,171,858 issued May 8, 2012, incorporated herein by reference. A propulsion unit can be either integrated with or separate from a levitation unit.

For example, a propulsion unit separate from the levitation unit is described in Wamble III, International Publication WO 2013/003387 A2 published 3 Jan. 2013, incorporated herein by reference. A maglev vehicle is levitated by one or more of the levitation units (e.g. 410 in FIGS. 2, 3, 4, 9, 10, 11A, 11B of WO 2013/003387 A2), and each levitation unit has one or more elongated magnetic poles. When the vehicle engages the Maglev track, each elongated magnetic pole is adjacent to a flat vertical surface of a stationary electrically conductive rail of the track, and the elongated magnetic pole is inclined at a variable angle. When the elongated magnetic pole moves along the rail, the magnetic field from the elongated magnetic pole induces eddy currents in the rail, and the eddy currents in the rail produce lift upon the elongated magnetic pole. Under some typical operating conditions, the lift is generally proportional to the angle of inclination and the velocity of the vehicle. (See paragraphs [0066] to [0072] of WO 2013/003387 A2.) The angle of the levitation unit can be controlled via a controller that includes at least one processor and/or memory. The controller can be controlled remotely or based upon loading characteristics of the car or desired speed including congestion on the guideway. For example, a maglev vehicle has four levitation units, and each levitation unit includes a respective angle adjustment mechanism, so that there are four angle adjustment mechanisms, namely a front right angle adjustment mechanism, a front left angle adjustment mechanism, a rear right angle adjustment mechanism, and a rear left angle adjustment mechanism. Each of the angle adjustment mechanisms are coupled to a bogie of a vehicle at one portion and coupled to one of the levitation units at another portion. The angle adjustment mechanism can be a threaded coupler, for example a screw, a machine threaded coupler, or the like. In at least one embodiment, the angle the adjustment mechanisms can be controlled by a controller and servo motors. Other control mechanisms can also be implemented. In yet other embodiments, the angle adjustment mechanisms can maintain preset angles for the levitation units. (See paragraphs [0045] to [0046] of WO 2013/003387 A2 and FIG. 4 of WO 2013/003387 A2.)

DETAILED DESCRIPTION

It will be appreciated that numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim.

The present disclosure is directed to a segmented track for a Maglev vehicle. In general, track for a Maglev vehicle typically includes a Maglev reaction rail portion for supporting the Maglev vehicle via magnetic force between the Maglev reaction rail portion and the Maglev vehicle, and a structural support portion for supporting the Maglev reaction rail portion with respect to the Earth. The structural support portion maintains a specified curvature and inclination of the Maglev reaction rail portion. The structural support portion may include support pillars for elevating the Maglev reaction rail portion above the surface of the Earth.

Typically the Maglev reaction rail portion is configured as either monorail or as two parallel-spaced rails. For the case of two parallel-spaced rails, the rails include curves and the rails are banked around the curves. The structural support portion may include cross-ties to maintain a constant spacing between the rails.

It is desired to provide a construction for the Maglev track that is not only economical but also pleasing in appearance. It is also desired to minimize the footprint of the Maglev track so that it can be routed in a way that is most convenient for the transport of people or freight. Moreover, it is desired to minimize the disruption of traffic during the installation of the Maglev track. These desires are addressed by a segmented form of construction for the Maglev track, including a series of metallic structural support segments, and a series of metallic reaction rail segments, wherein neighboring ones of the structural support segments are joined together end-to-end by fused metal, and neighboring ones of the reaction rail segments are joined together end-to-end by fused metal, and each segment of the structural support portion includes three cast metal components joined together by fused metal. In this fashion, the structural support segments serve as a structural spine that supports the weight of the Maglev reaction rails and the Maglev vehicles, and each structural support segment serves as a vertebra of the structural spine.

In one embodiment, the three cast metal components of the vertebra are similar in shape and are joined together at three vertices in a triangular configuration to form what will be called a "high profile vertebra."

In another embodiment, two of the three cast metal components of the vertebra have a similar shape but these two cast metal components are less than half the size of the third cast metal component. The two smaller cast metal components are joined to opposite sides of the third cast metal component but the two smaller cast metal components are not joined directly to each other. This configuration will be called a "low profile vertebra" because it has a much lower profile than the high profile vertebra.

Figure 34:
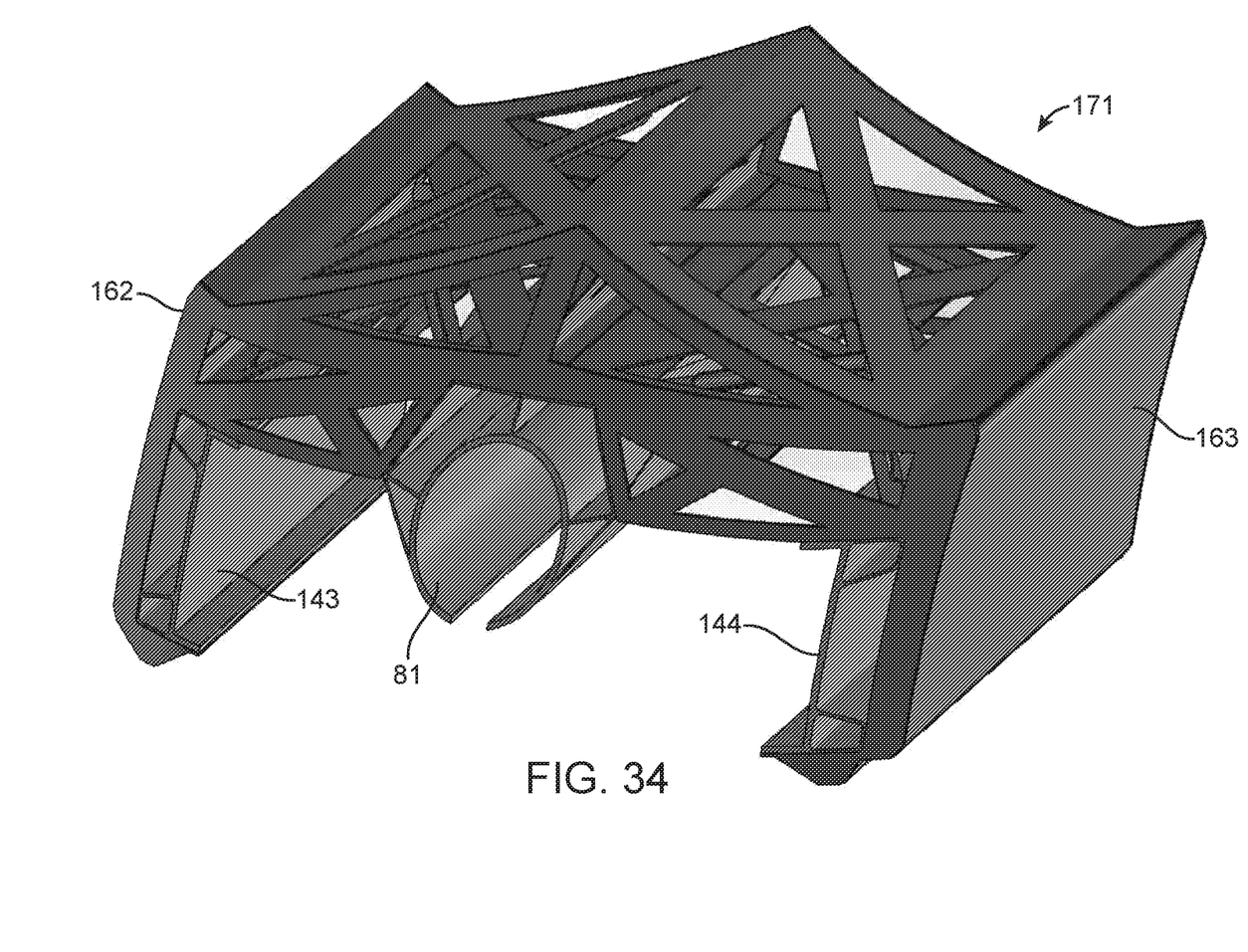
FIG. 34 is a perspective view of a weldment vertebra.
Figure 35:
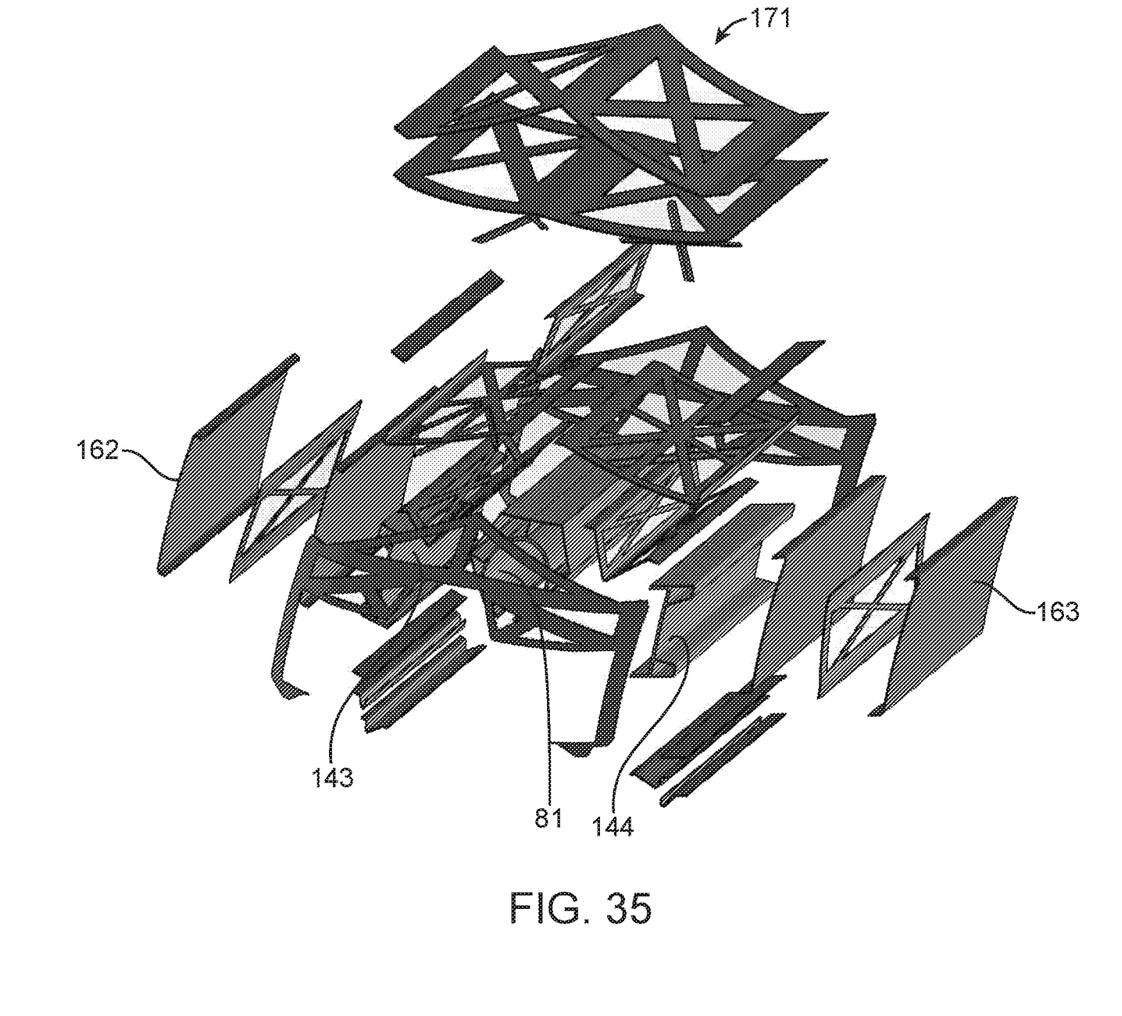
FIG. 35 is an exploded view of the weldment vertebra of FIG. 34.

While the present disclosure describes cast components, it is within the scope of this disclosure for a vertebra to be formed by weldment, casting, 3D metal printed parts or any combination thereof. An example embodiment of a weldment segment is shown in FIGS. 34 and 35.

Figure 1:
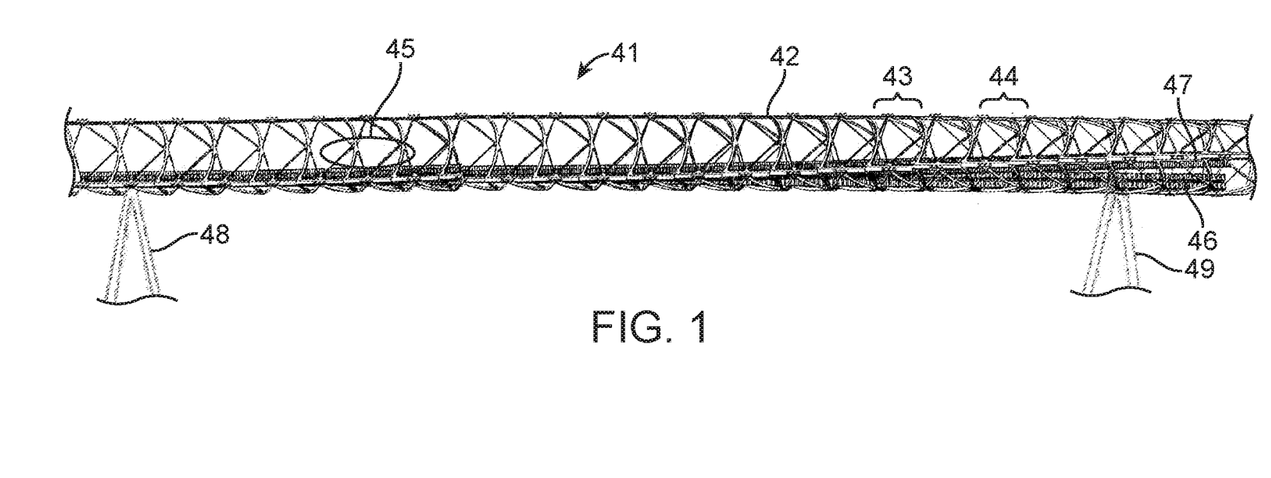
FIG. 1 shows an elevated Maglev track including a spine of high profile vertebrae.

FIG. 1 shows an elevated Maglev track 41 including a structural spine 42 of high profile vertebrae 43, 44. The spine 42 supports the weight of a vehicle 45 and two reaction rails 46, 47 that interact with a levitation and drive system of the vehicle. The reaction rails 46, 47 fit inside the structural spine 42. In this example, the structural spine 42 is elevated above the Earth by support pillars 48, 49 spaced along the spine 42. In at least one example, each vertebra is 1.4 meters long, and the support pillars 48, 49 are spaced up to a distance of 60 meters apart.

Figure 2:
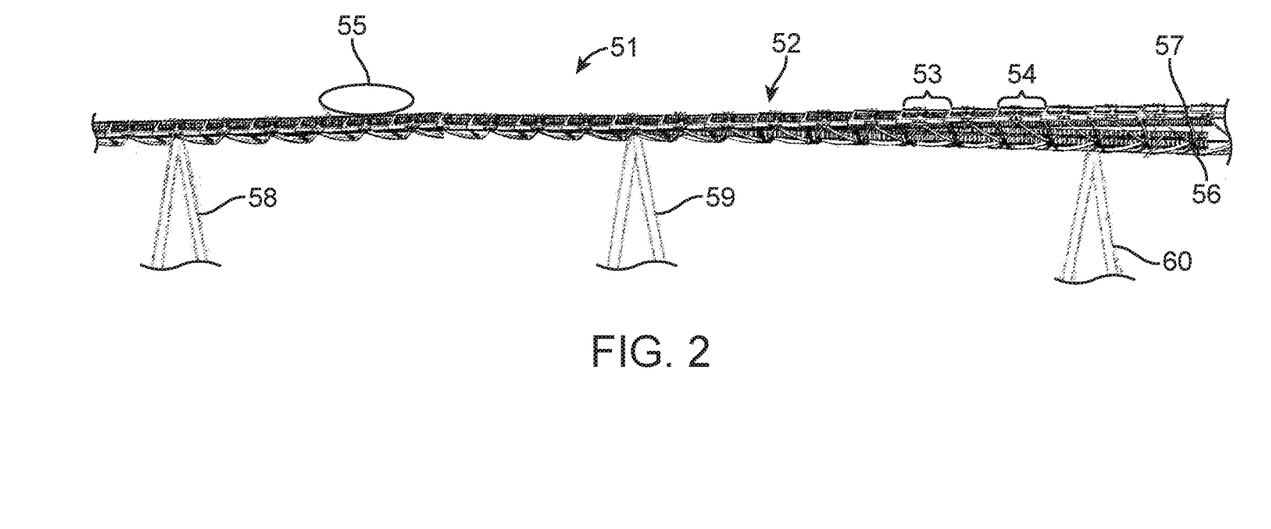
FIG. 2 shows an elevated Maglev track including by a spine of low profile vertebrae.

FIG. 2 shows an elevated Maglev track 51 including a structural spine 52 of low profile vertebrae 53, 54. The spine 52 supports the weight of a vehicle 55 and two reaction rails 56, 57 that interact with a levitation and drive system of the vehicle. The reaction rails 56, 57 fit inside the structural spine 52. In this example, the structural spine 52 is elevated about the Earth by support pillars 58, 59, 60 spaced along the spine 52. In at least one example, each vertebra is 1.4 meters long, and the support pillars 58, 59, 60 are spaced up to a distance of 30 meters apart.

The low profile vertebrae 52, 53 provide a Maglev track 51 that is less visually obtrusive than a Maglev track (e.g., 41 in FIG. 1) made with the high profile vertebrae, but the high profile vertebrae provides a Maglev track (e.g., 41 in FIG. 1) than can span greater distances between support pillars. A Maglev track could be made with some sections of low profile vertebrae, and other sections of high profile vertebrae. The sections of high profile vertebrae could be used to span roads, rivers, or other areas that are undesirable locations for support pillars.

A method of designing the Maglev track begins with a layout of a desired path for the Maglev track on a map or a survey in order to choose locations for support pillars along the path. The path has certain constraints, such as limits on inclination or grade, pitch or roll, and turn radius, which may depend on the desired speed of the vehicle under magnetic levitation. In at least one example, the inclination or pitch may be limited to no more than 1½ to 2 degrees, and the turn radius may be limited to no more than 20 to 30 meters, for a speed of 40 to 50 miles per hour under magnetic levitation. In other implementations the inclination can be different depending on the requirements of the passengers or freight. In the example given, it minimizes the forces exerted on a passenger. In other implementations with freight or particular types of passengers the inclination or pitch can be greater and the radius can be reduced.

Once the support pillar locations have been chosen, a mathematical spline function is fitted to the support pillar locations. The mathematical spline function is sampled at points spaced from each other by 1,400 millimeters to break the spline into a set of segments 1,400 mm long and a set of segments centered on the 1,400 mm segments each 140 mm long. From these segments, numerical control (NC) code is generated for cutting and drilling of the modular components of the Maglev track. Each vertebra and its corresponding length of the reaction rails are assembled in the factory and shipped to the site in the field, or each vertebra and its corresponding length of the reaction rails are assembled in the field. The vertebrae assemblies are joined end-to-end at the site in the field using on-site jigs and machines.

Figure 3:
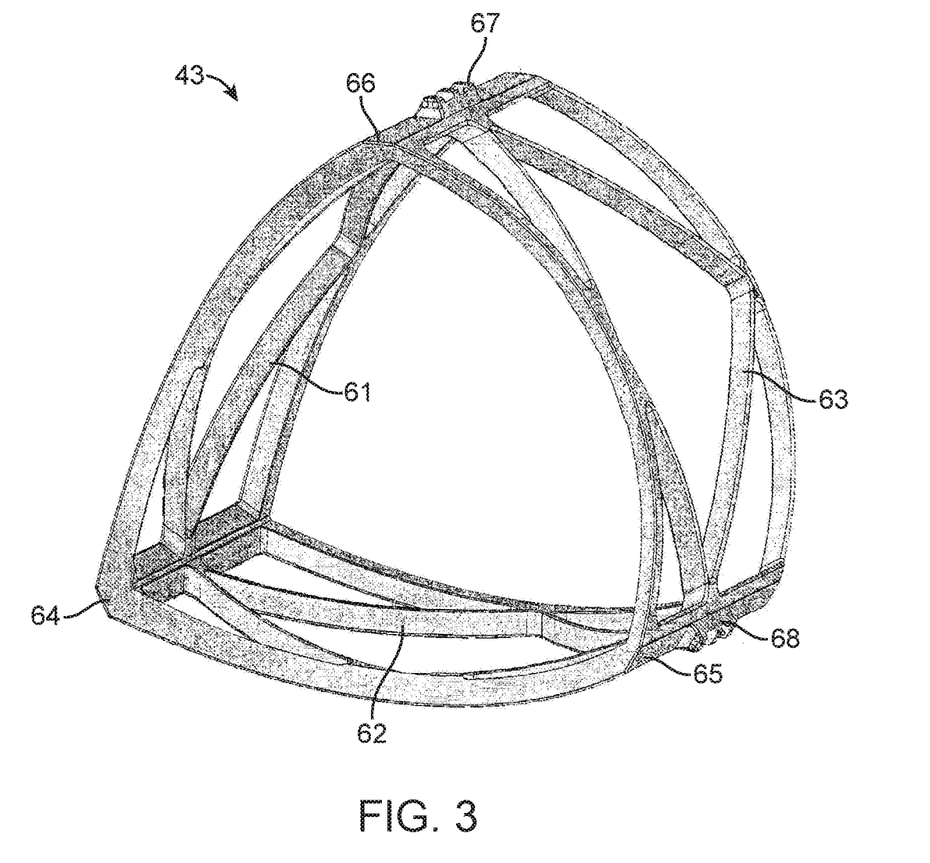
FIG. 3 is a perspective view of a high profile vertebra.
Figure 4:
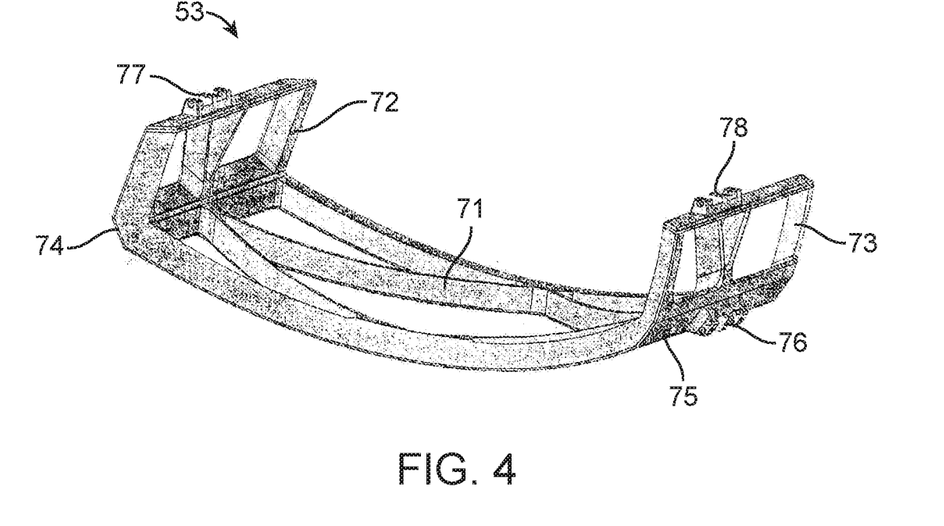
FIG. 4 is a perspective view of a low profile vertebra.
Figure 5:
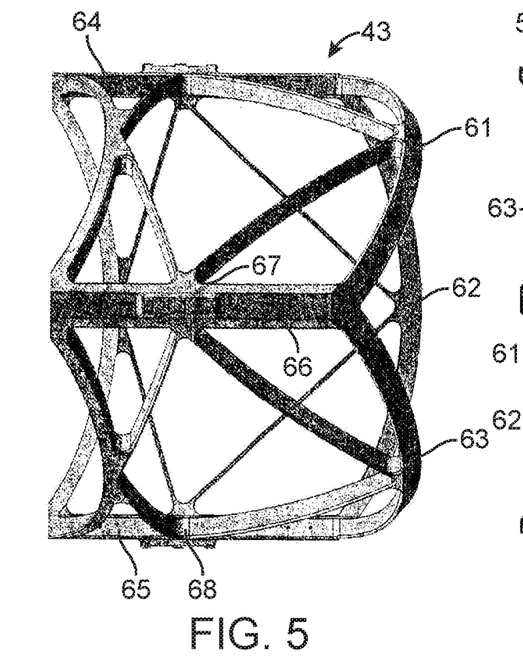
FIG. 5 is a top view of the high profile vertebra introduced in FIG. 3.
Figure 6:
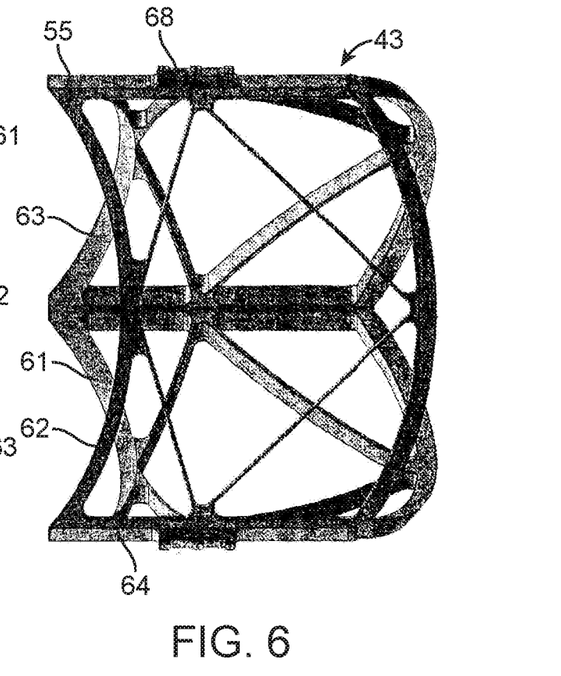
FIG. 6 is a bottom view of the high profile vertebra introduced in FIG. 3.
Figures 7, 8:
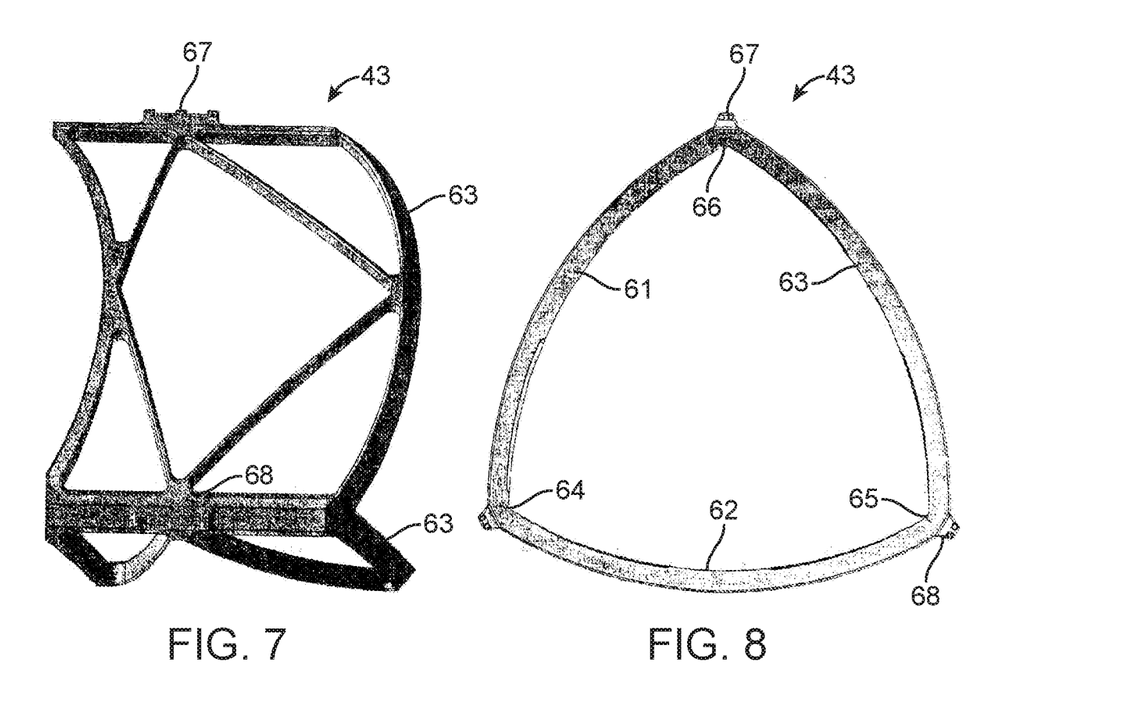
FIG. 7 is a side view of the high profile vertebra introduced in FIG. 3.
FIG. 8 is an end view of the high profile vertebra introduced in FIG. 3.
Figure 9:
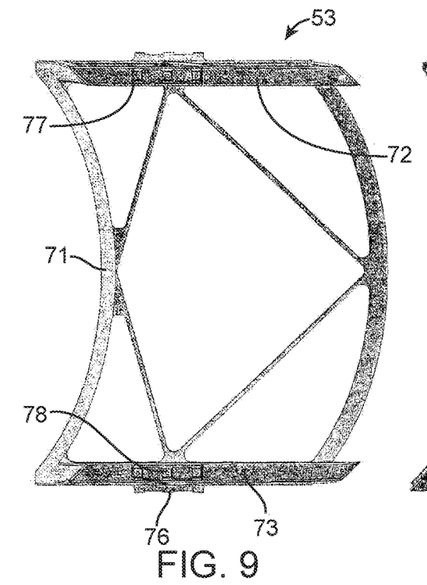
FIG. 9 is a top view of the low profile vertebra introduced in FIG. 4.
Figure 10:
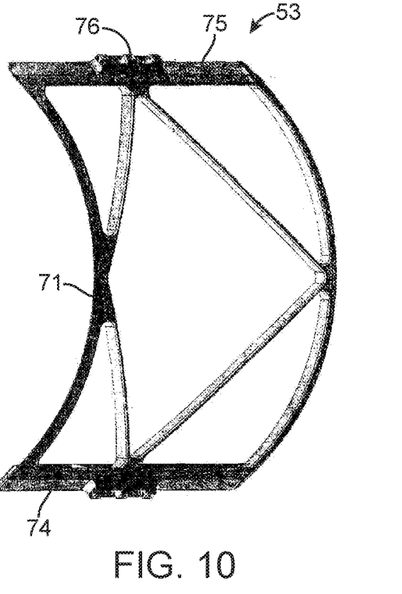
FIG. 10 is a bottom view of the low profile vertebra introduced in FIG. 4.
Figures 11, 12:
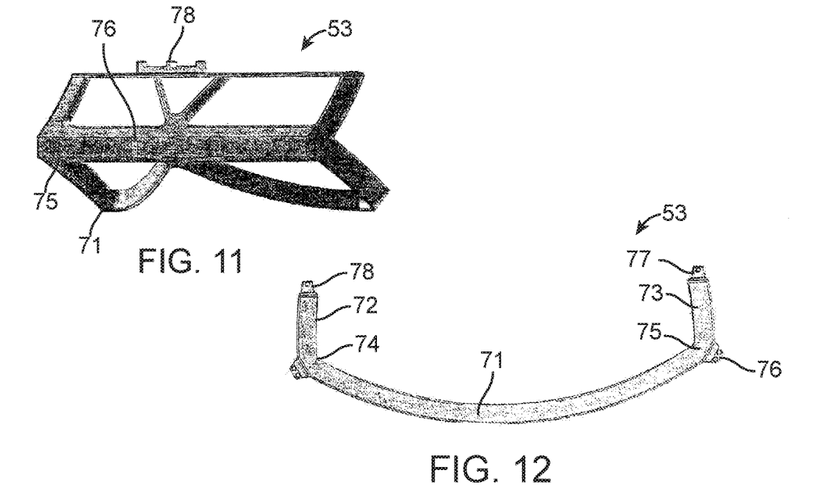
FIG. 11 is a side view of the low profile vertebra introduced in FIG. 4.
FIG. 12 is an end view of the low profile vertebra introduced in FIG. 4.

FIG. 3 shows the high profile vertebra 43, and FIG. 4 shows a low profile vertebra 53. Each vertebra has a spherical convex face on one end, and a complementary spherical concave face on the other end. In at least one example, the centers of these spherical faces are nominally 1,400 millimeters apart. High profile vertebrae are used where the visual impact of a larger spine is not an issue and longer support pillar spacing is required. Low profile vertebrae are used to minimize the visual intrusion of the Maglev track where shorter support pillar spacing is acceptable.

The high profile vertebra 43 in FIG. 3 and FIGS. 5 to 8 forms a closed triangular tube. In at least one example, the high profile vertebra 43 is composed of three identical full face metal castings 61, 62, 63 mated together at three vertices 64, 65, 66. A respective tension tie rod mount 67, 68, 69 is disposed at each vertex. The metal castings are joined by fused metal in a welding, sintering, or braising process. In at least one example, the metal castings are made of steel or aluminum casting alloy, such as aluminum alloy 356.

The low profile vertebra 53 in FIG. 4 and FIGS. 9 to 12 is composed of one full face casting 71 and two partial face castings 72, 73 forming a U-shaped structure. The partial face castings 72, 73 are joined to the full face casting 71 at two vertices 72, 75. A respective tension tie rod mount 76 is disposed at each vertex. A respective tension tie rod mount 77, 78 is also disposed on an upper surface of each of the two partial face castings 72, 73.

During the manufacturing process, the full and partial face castings are sand cast with protrusions on the concave faces. These protrusions mate with spherical depressions that are precisely drilled in convex faces of a neighboring vertebra in the spine, in accordance with the desired curvature of the spine. The vertebra can be mated to each other within a few degrees of pitch, yaw and roll, allowing the formation of a spine structure that can follow any 3D spline. These protrusions are formed on the concave faces rather than the convex faces in order to protect the protrusions from damage that could otherwise occur if the protrusions were on the convex faces and the castings were laid on their convex faces. The face castings also have protrusions and depressions on the faces where the face castings meet one another to align neighboring castings at the vertices to facilitate the joining of the neighboring castings.

In addition, according to the NC code generated from the survey spline, the lower full face casting has cast-in protrusions for mating to reaction rail segments. Prior to assembling the face castings together to form a vertebra, these reaction rail mounting protrusions are cut with a 6-axis fly cutter so that mating flats on the reaction rail segments fit snugly to the vertebra.

For joining face castings or joining vertebra together or joining reaction rail segments to a vertebra, steel parts can be welded together, and aluminum parts can be joined to each other or joined to other kinds of metal by a sintering or braising process in which sintering or braising paste is heated with electrical current to form metal that becomes fused with the parts to be jointed. The electrical current can be supplied to the parts to be joined together from a tungsten inert gas (TIG) electrode in a process similar to TIG welding. Aluminum parts such as reaction rail segments could be joined to steel parts with fasteners such as bolts or rivets.

Figure 13:
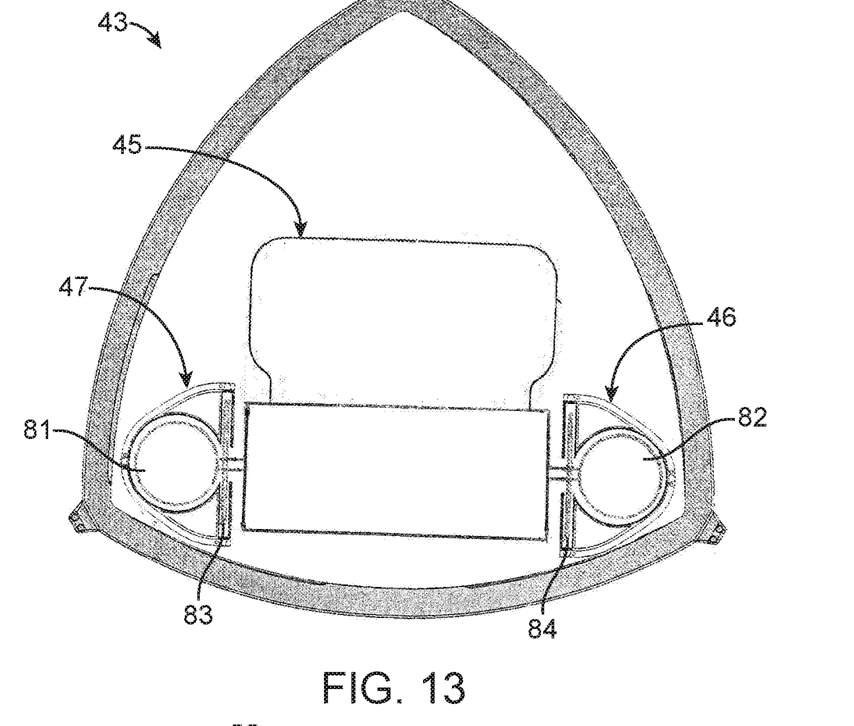
FIG. 13 shows the high profile vertebra supporting a pair of parallel-spaced Maglev reaction rails and a Maglev vehicle engaged in the Maglev reaction rails.

FIG. 13 shows the high profile vertebra 43 supporting the parallel-spaced Maglev reaction rails 46, 47 and the Maglev vehicle 45 having propulsion units 81, 82 and levitation units 83, 84 engaged in the Maglev reaction rails. Further details regarding the propulsion units 81, 82 and the levitation units 83, 84 are found in Wamble III, International Publication WO 2013/003387 A2 published 3 Jan. 2013, incorporated herein by reference.

Figure 14:
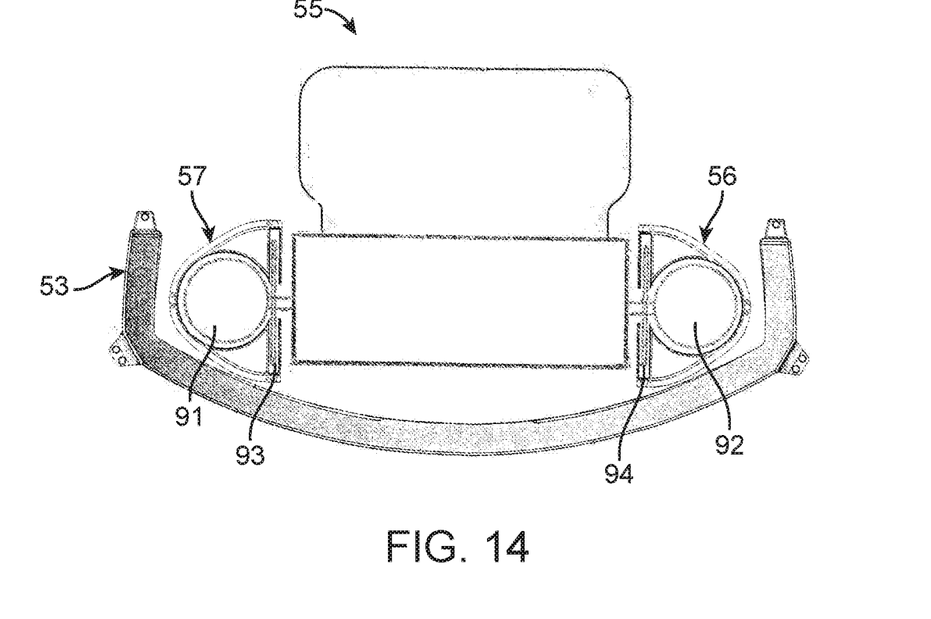
FIG. 14 shows the low profile vertebra supporting a pair of parallel-spaced Maglev reaction rails and a Maglev vehicle engaged in the Maglev reaction rails.
Figure 15:
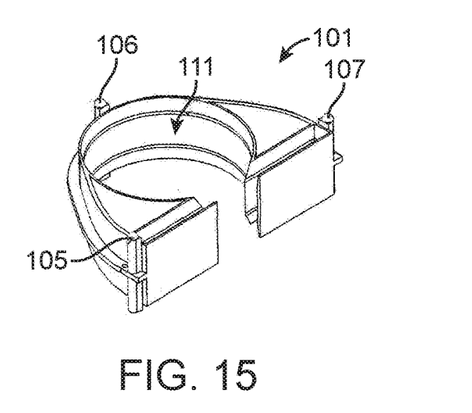
FIG. 15 is a perspective view of the top and front of a reaction rail segment.
Figure 16:
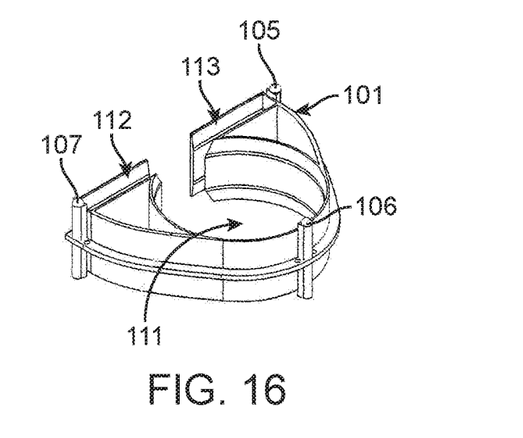
FIG. 16 is a perspective view of the top and rear of the reaction rail segment.
Figure 17:
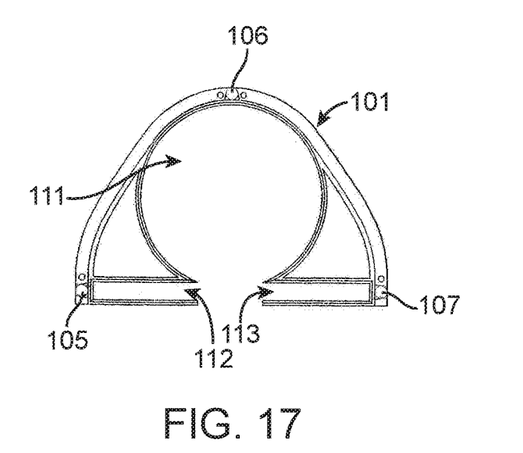
FIG. 17 is a top view of the reaction rail segment.
Figure 18:
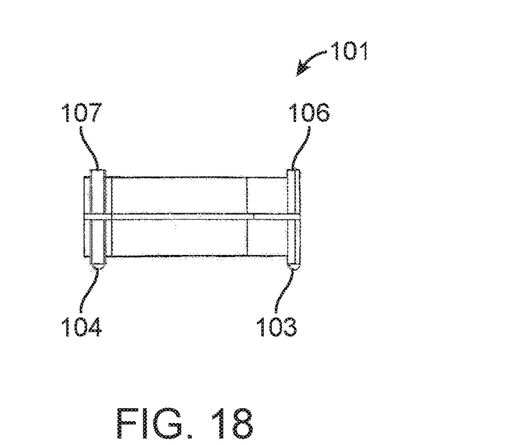
FIG. 18 is a side view of the reaction rail segment.
Figure 19:
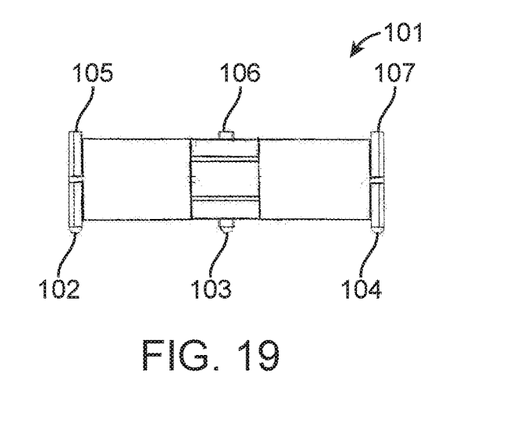
FIG. 19 is a front view of the reaction rail segment.
Figure 20:
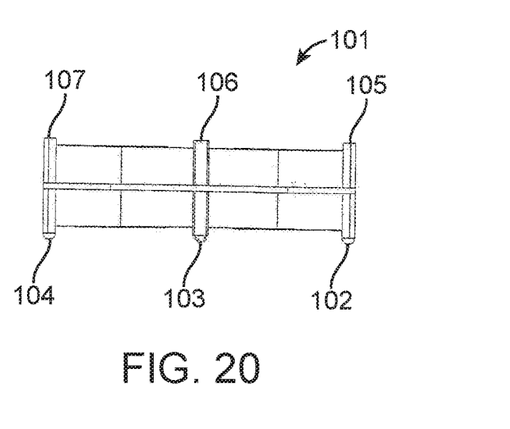
FIG. 20 is a rear view of the reaction rail segment.

FIG. 14 shows the low profile vertebra 53 supporting the parallel-spaced Maglev reaction rails 56, 57 and the Maglev vehicle 55 having propulsion units 91, 92 and levitation units 93, 94 engaged in the Maglev reaction rails.

FIGS. 15 to 20 show various views of a reaction rail segment 101. The reaction rail segment 101 has a central channel 111 to magnetically react with a propulsion unit of the Maglev vehicle, and channels 112 and 113 to react with a levitation unit of a Maglev vehicle. In at least one example, the reaction rail segment 101 is a die cast aluminum module, 140 mm deep, cast with three protrusions 102, 103, 104 molded on one flat face and three flats molded into it on the other flat face. After casting each reaction rail module is robotically placed in a fixture and three bull-nose cutters ganged together on a 6-axis machining head cut depressions in the flats at a programmed X, Y, Z, Pitch, Yaw, Roll position according to the NC code generated from the survey spline. The reaction rail segments are then welded together in groups of ten.

Figure 21:
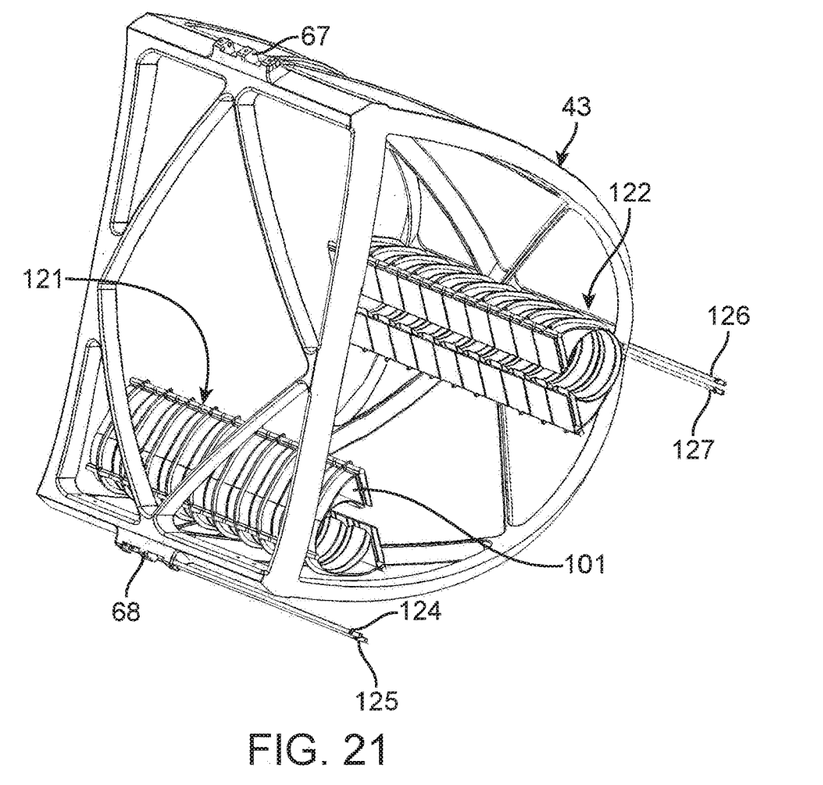
FIG. 21 shows two assemblies of reaction rail segments mounted in a high profile vertebra, and four tension rods attached to and extending from the high profile vertebra.

FIG. 21 shows two assemblies 121, 122 of reaction rail segments mounted in the high profile vertebra 43, and four tension rods 124, 125, 126, 127 attached to and extending from the high profile vertebra. In this example, each assembly 121, 122 is composed of ten reaction rail segments 101. Each tension rod is threaded at each end to receive a spherical nut (not shown) on each end. Each nut is screwed onto an end of the tension rod and tightened to apply tension to the tension rod after the end of the tension rod has been inserted into a respective hole in the end of a respective tension rod mount 67, 68.

Figure 22:
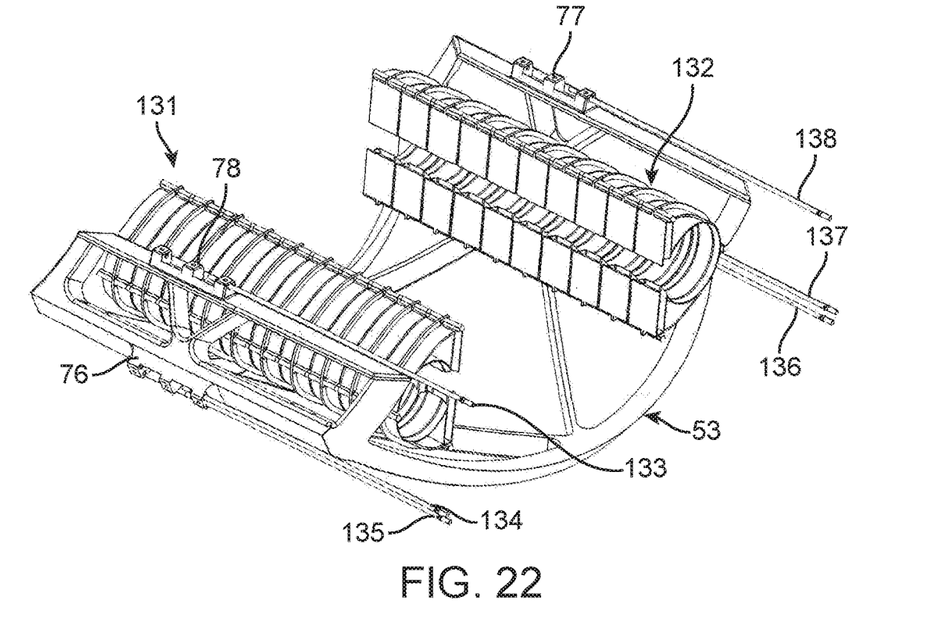
FIG. 22 shows two assemblies of reaction rail segments mounted in a low profile vertebra, and six tension rods attached to the high profile vertebra.

FIG. 22 shows two assemblies 131, 132 of reaction rail segments mounted in the low profile vertebra 53, and six tension rods 133, 134, 135, 136, 137, 138 attached to the high profile vertebra.

For either a high profile vertebra or a low profile vertebra, two of the reaction rail assemblies are loaded into a vertebra after the face castings have been machined and assembled into the vertebra. One reaction rail segment is loaded in each of the left and right sides of the vertebra. Flats with protrusions cast into the individual reaction rail modules mate with machined faces on the vertebra face castings, and the reaction rail modules are secured to the vertebra face castings. In at least one example, the reaction rail segments are welded to the vertebra face castings either with sintering paste and electrical heating for aluminum vertebra, or bolted to the vertebra face castings for steel vertebra.

The Maglev track is constructed by interconnecting the assemblies of FIG. 21 or FIG. 22. A fixture is mounted to a first assembly and then a second assembly is loaded into the fixture so that the two assemblies become aligned with each other. The first assembly can be an assembly on an end of the Maglev track, so that the Maglev track can be extended incrementally by the addition of the second assembly. The process can be repeated until the Maglev track is extended to a desired length.

Once the fixture has aligned the second assembly with the first assembly, the convex face of the first vertebra, the concave face of the second vertebra, and the mating faces of the reaction rails are fused together. The reaction rails are aluminum and are fused with sintering paste and electrically heated. The vertebra are joined the same way if they are aluminum alloy or welded if they are steel.

During the alignment of the two assemblies in the fixture, the tension rods are assembled to connect one vertebra to the next. The tension rods serve to fine tune the pitch, yaw and roll of the second vertebra before it is fused to the first vertebra. Additionally, the tension rods serve to take out the tension forces on the weldments.

Figures 23, 24:
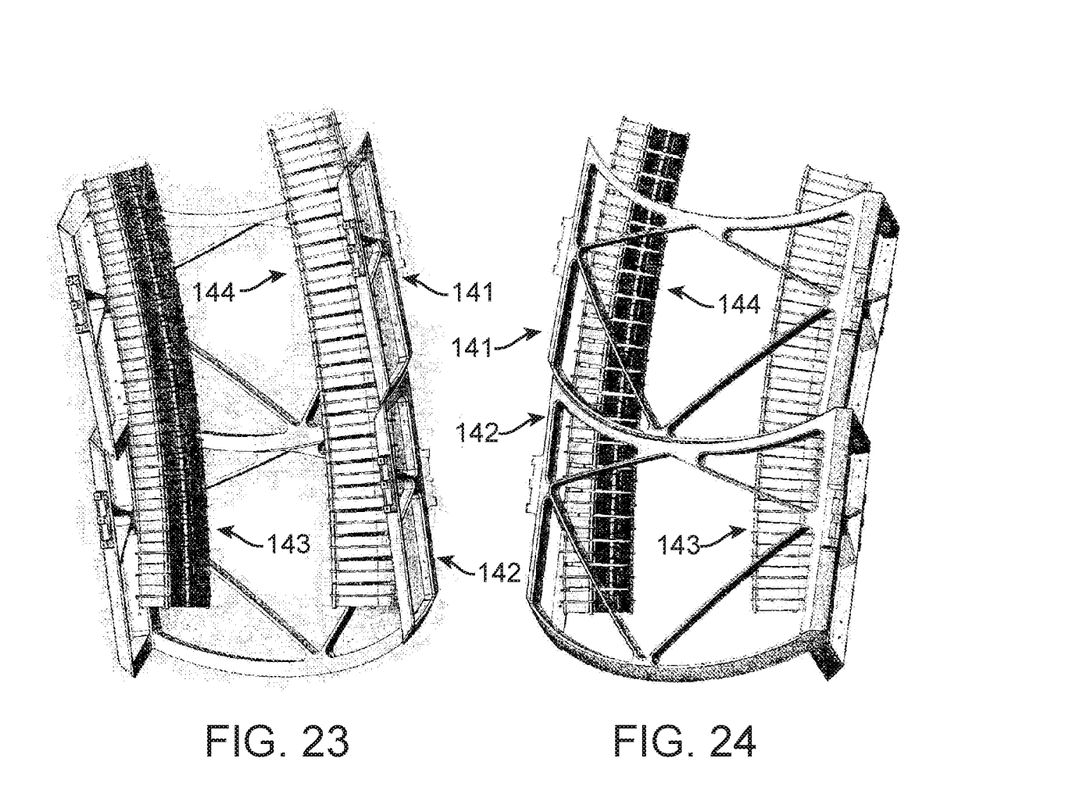
FIG. 23 shows a top view of two neighboring low profile vertebrae joined together at a selected azimuthal angle and a selected inclination angle to provide support for a pair of curved and parallel-spaced reaction rails passing through the two neighboring low profile vertebrae.
FIG. 24 shows a rear view of the assembly of FIG. 23.
Figure 25:
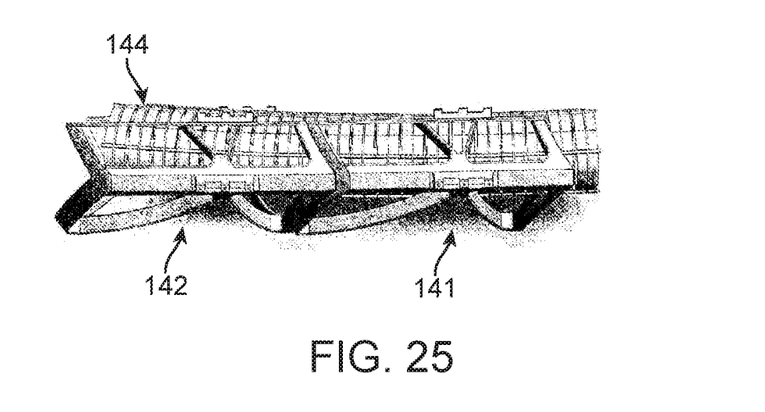
FIG. 25 shows a side view of the assembly of FIG. 23.
Figure 26:
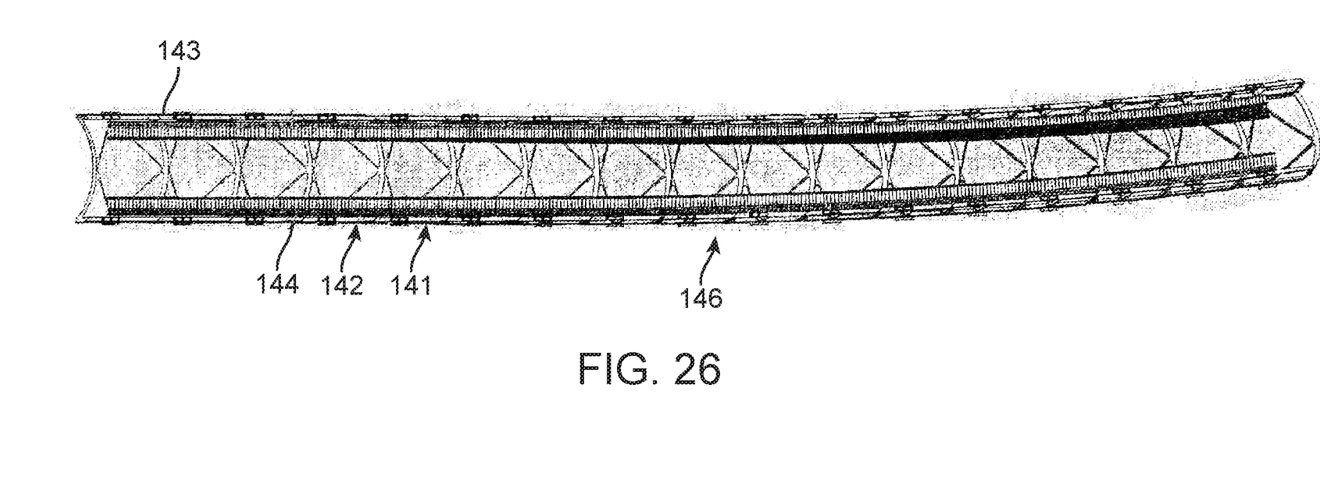
FIG. 26 shows a top view of a curved and banked section of Maglev track supported by a spine of the low profile vertebrae.
Figure 27:
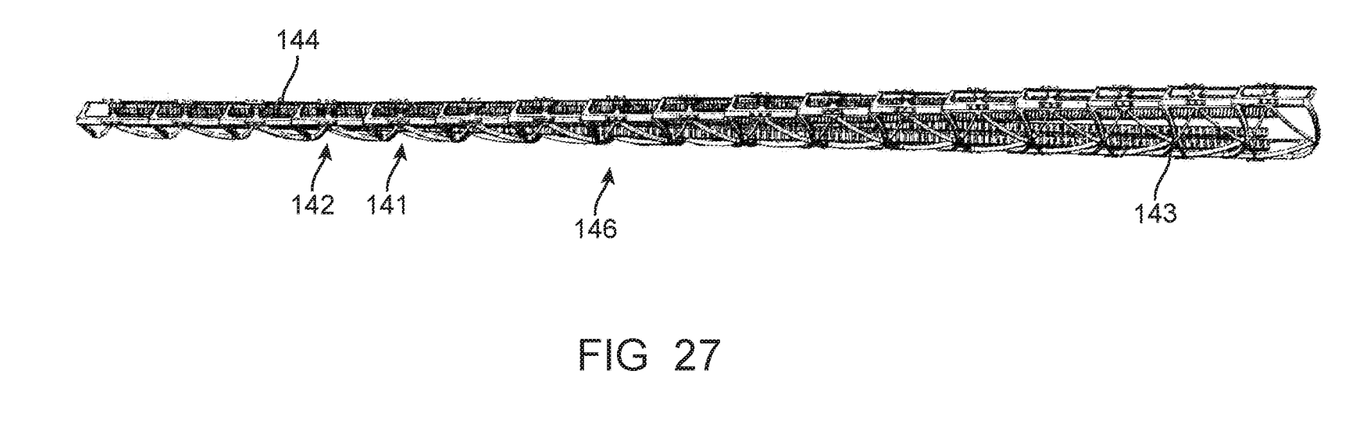
FIG. 27 shows a side view of the assembly in FIG. 26.
Figure 28:
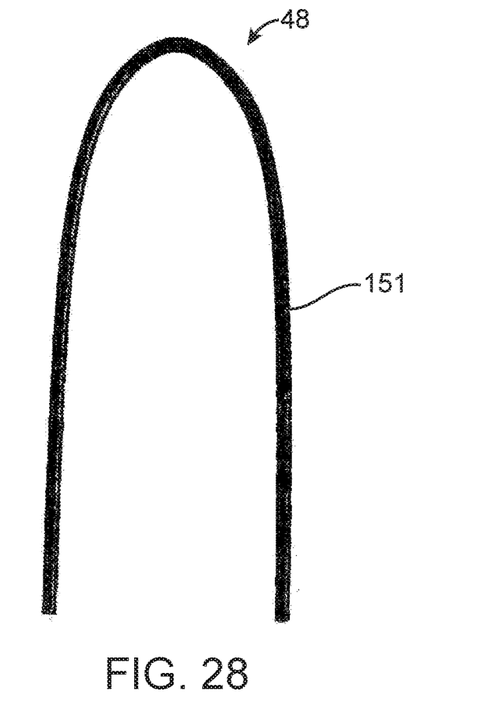
FIG. 28 is a front view of a support for elevating a Maglev spine and track.
Figure 29:
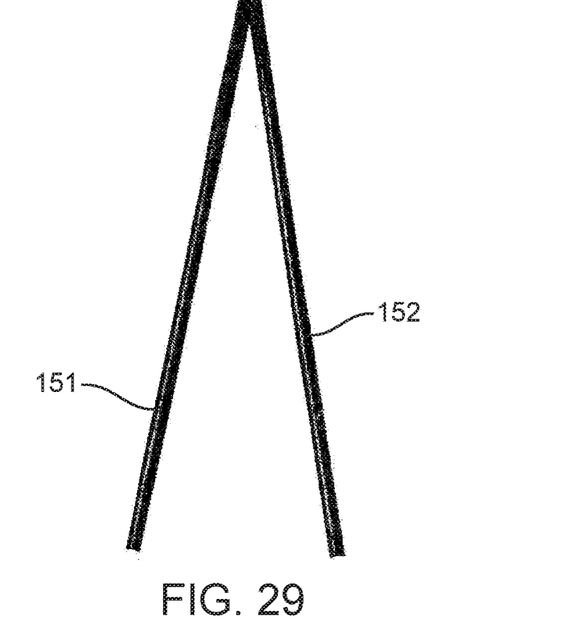
FIG. 29 is a side view of the support of FIG. 28.
Figure 30:
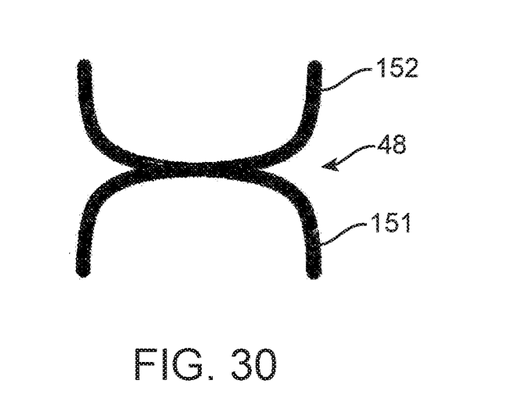
FIG. 30 is a top view of the support of FIG. 28.
Figure 31:
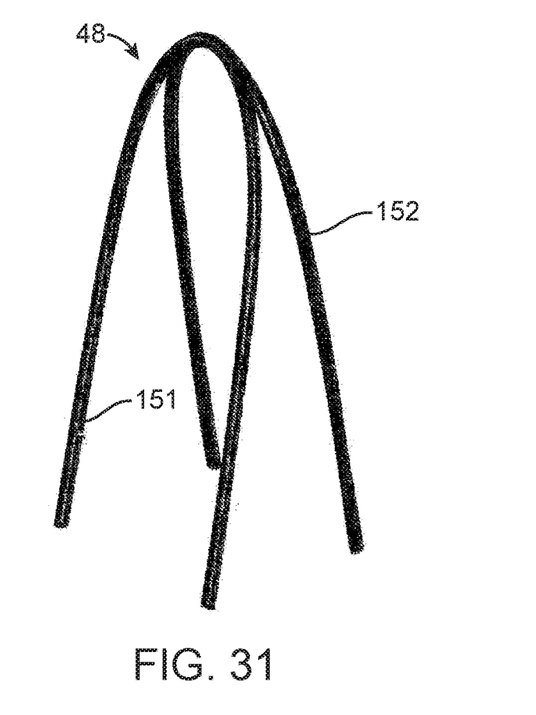
FIG. 31 is a perspective view of the support of FIG. 28.

FIGS. 23 to 25 show two neighboring low profile vertebrae that have been joined together at a selected azimuthal angle and a selected inclination angle to provide support for a pair of curved and parallel-spaced reaction rails 143, 144 passing through the two neighboring low profile vertebrae. FIGS. 26 and 27 show the Maglev track 146 resulting when additional low-profile vertebrae have been joined incrementally to the assembly of FIGS. 23 to 25.

FIGS. 28 to 31 show views of the support pillar 48. The support pillar 48 is constructed from two steel tubes 151, 152. Each steel tube 151, 152 is bent into a U shape, and then the two steel tubes are welded together at their apexes. This form of construction for the support pillar 48 provides a pleasing visual form and minimal visual obstruction.

Figure 32:
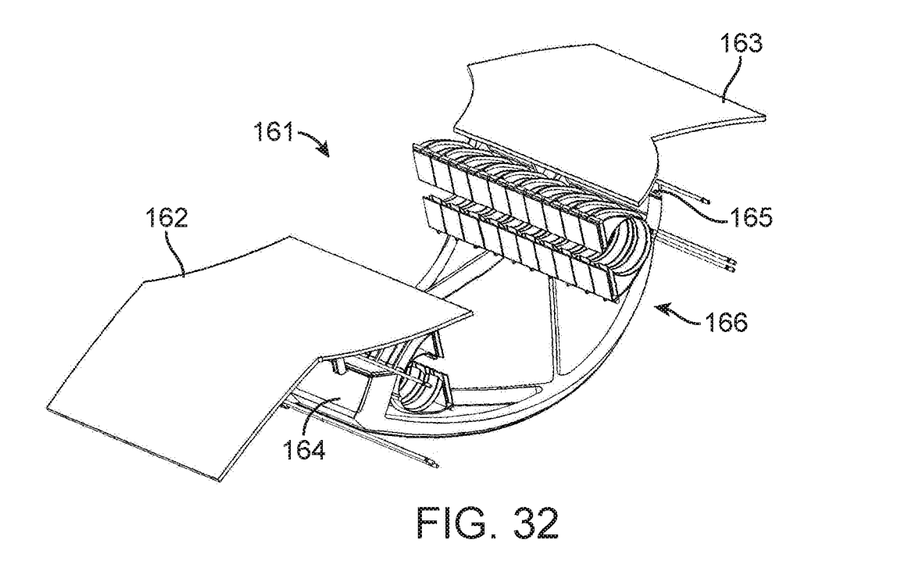
FIG. 32 is a perspective view of a low profile vertebra assembly including side cover plates.

FIG. 32 is a perspective view of a low profile vertebra assembly 161 including side cover plates 162, 163 attached to the half castings 164, 164 of a low profile vertebra 166. The side cover plates 162, 163 could be used to provide a flat surface at floor level in a station where passengers or freight would be loaded into a stationary Maglev vehicle.

Figure 33:
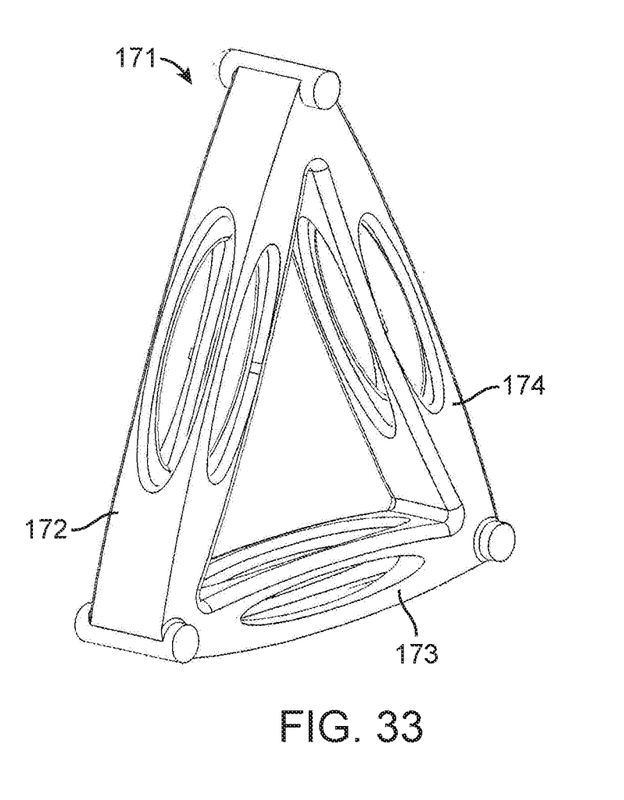
FIG. 33 is a perspective view of a vertebra for a non-levitating track segment.

FIG. 33 is a perspective view of a vertebra 171 for a non-levitating track segment. Non-levitation track segments could be used for supporting a Maglev vehicle that would disengage from the Maglev reaction rails and would travel on a roadway using conventional wheels at the bottom of the Maglev vehicle. The vertebra 171 is composed of three identical metal castings 172, 173, 174 joined to form a triangular tube through which the Maglev vehicle would be driven. In this case the lower casting 173 would support a roadway instead of a pair of Maglev reaction rails.

FIGS. 34 and 35 illustrate an example embodiment of a weldment vertebra. FIGS. 34 and 35 illustrate an example embodiment of a weldment vertebra. As can be appreciated in FIGS. 34 and 35, the vertebra 171 has one central propulsion unit 81 and two side mounted reaction rails 143, 144. The central propulsion unit 81 and reaction rails 143, 144 can be formed from aluminum, more specifically die cast aluminum. The remaining portion of the vertebra 171 including the side cover plates 162, 163 and castings 164 can be formed of steel. The weldment vertebra 171 can allow a Maglev vehicle to hang below the vertebra 171 and have a propulsion generator disposed above the vehicle and configured to be received within the propulsion unit 81. In other instances, the weldment vertebra 171 can receive a Maglev vehicle above the vertebra 171 and have the propulsion generator disposed below the vehicle and configured to be received within the propulsion unit 81. While the implementation as shown in FIGS. 1-33 has generally been illustrated where the vehicle is mounted above the reaction rails, the vehicle can be implemented such that it is mounted below the reaction rails. In yet other examples, the implementation can be used to suspend different types of tracks than the ones described herein.

What is claimed is:

1. A segmented track for a Maglev vehicle, said segmented track comprising:
   a Maglev reaction rail portion for supporting the Maglev vehicle, the Maglev reaction rail portion including a series of metallic reaction rail segments; and
   a structural support portion for supporting the Maglev reaction rail portion, the Maglev reaction rail portion being mounted within and fastened to the structural support portion, the structural support portion including a series of metallic structural support segments;
   wherein neighboring ones of the structural support segments are joined together end-to-end by fused metal, and neighboring ones of the reaction rail segments are joined together end-to-end by fused metal, and each segment of the structural support portion includes three metal components joined together by fused metal.

2. The segmented track as claimed in claim 1, wherein the three metal components are joined at three vertices to surround the reaction rail portion.

3. The segmented track as claimed in claim 1, wherein at least three of the reaction rail segments are mounted within and fastened to each of the structural support segments.

4. The segmented track as claimed in claim 1, wherein the reaction rail portion includes two parallel-spaced reaction rails secured to said each segment of the structural support portion.

5. The segmented track as claimed in claim 1, wherein each of the structural support segments has a concave face at one end and a complementary convex face at another end so that the faces facilitate joining of two neighboring structural support segments to provide a selected azimuthal angle and a selected inclination angle between the neighboring structural support segments.

6. The segmented track as claimed in claim 1, further including tensioned tie rods joining neighboring ones of the structural support segments.

7. The segmented track as claimed in claim 1, wherein the segmented track is formed by weldments, castings, or 3D metal printed parts.

8. A segmented track for a Maglev vehicle, said segmented track comprising:
   a Maglev reaction rail portion for supporting the Maglev vehicle, the Maglev reaction rail portion including a series of metallic reaction rail segments; and
   a structural support portion for supporting the Maglev reaction rail portion, the Maglev reaction rail portion being mounted within and fastened to the structural support portion, the structural support portion including a series of metallic structural support segments;

wherein neighboring ones of the structural support segments are joined together end-to-end by fused metal, and neighboring ones of the reaction rail segments are joined together end-to-end by fused metal, and each of the structural support segments has a concave face at one end and a complementary convex face at another end so that the faces facilitate joining of two neighboring structural support segments to provide a selected azimuthal angle and a selected inclination angle between the neighboring structural support segments.

9. The segmented track as claimed in claim 8, wherein at least three of the reaction rail segments are mounted within and fastened to each of the structural support segments.

10. The segmented track as claimed in claim 8, wherein the reaction rail portion includes two parallel-spaced Maglev reaction rails secured to said each of the structural support segments.

11. The segmented track as claimed in claim 8, further including tensioned tie rods joining neighboring ones of the structural support segments.

12. The segmented track as claimed in claim 8, wherein each segment of the structural support portion includes three metal components joined together by fused metal, the three metal components are joined at two vertices, and each neighboring pair of segments of the structural portion are joined by at least two tensioned tie rods including a respective tensioned tie rod extending from each of the two vertices of each segment of the structural portion in said each neighboring pair of segments of the structural portion.

13. The segmented track as claimed in claim 8, wherein each segment of the structural support portion includes three metal components joined together by fused metal, the three metal components are joined at three vertices to surround the reaction rail portion, and each neighboring pair of segments of the structural portion are joined by at least three tensioned tie rods including a respective tensioned tie rod extending from each of the three vertices of each segment of the structural portion in said each neighboring pair of segments of the structural portion.

14. The segmented track as claimed in claim 8, wherein the segmented track is formed by weldments, castings, or 3D metal printed parts.

* * * * *